(12) United States Patent
Yang et al.

(10) Patent No.: US 10,917,892 B2
(45) Date of Patent: Feb. 9, 2021

(54) METHOD FOR PERFORMING BANDWIDTH PART SWITCHING BY A USER EQUIPMENT

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/375,159

(22) Filed: Apr. 4, 2019

(65) Prior Publication Data

US 2019/0313410 A1 Oct. 10, 2019

(30) Foreign Application Priority Data

Apr. 4, 2018 (KR) .......................... 10-2018-0039234

(51) Int. Cl.
*H04W 72/04* (2009.01)
*H04W 84/04* (2009.01)

(52) U.S. Cl.
CPC ...... *H04W 72/0453* (2013.01); *H04W 84/042* (2013.01)

(58) Field of Classification Search
CPC ..... H04L 1/0693; H04L 5/005; H04L 5/0053; H04W 24/10; H04W 36/0088; H04W 36/06; H04W 36/165; H04W 48/12; H04W 72/0453; H04W 76/27; H04W 36/0094; H04W 36/04; H04W 36/14; H04W 84/042
See application file for complete search history.

(56) References Cited

U.S. PATENT DOCUMENTS

2019/0182000 A1* 6/2019 Futaki .................... H04L 1/0693
2019/0261406 A1* 8/2019 Kim ....................... H04L 5/0096

* cited by examiner

*Primary Examiner* — Kan Yuen
(74) *Attorney, Agent, or Firm* — Fish & Richardson P.C.

(57) ABSTRACT

The present invention discloses a method of performing Bandwidth Part (BWP) switching by a user equipment (UE). The method comprises scheduling to receive a Synchronization Signal Block (SSB) during a first period; determining whether to perform the BWP switching based on the first period and a second period representing time duration for performing the BWP switching; and when the first period and the second period do not overlap, performing the BWP switching.

12 Claims, 15 Drawing Sheets

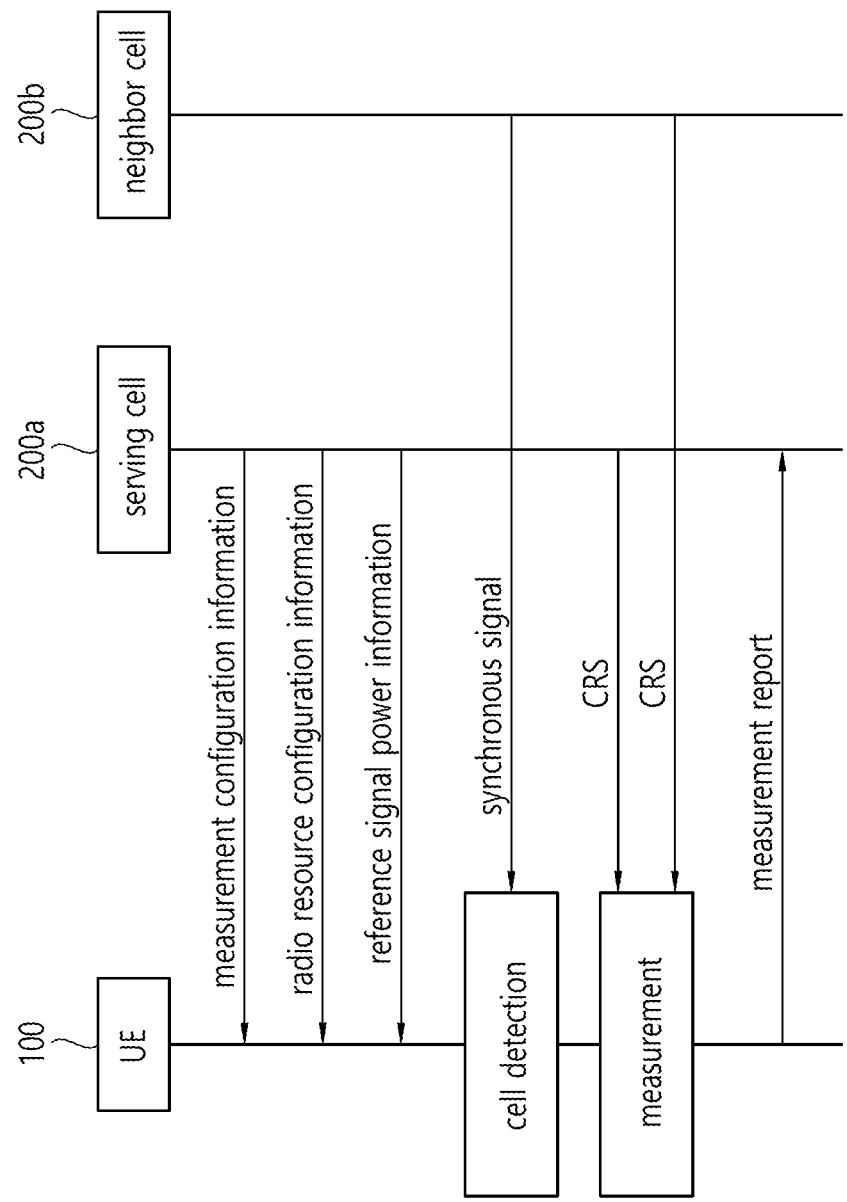

METHOD FOR PERFORMING BANDWIDTH PART SWITCHING BY A USER EQUIPMENT

CROSS-REFERENCE TO RELATED APPLICATIONS

Pursuant to 35 U.S.C. § 119 (e), this application claims the benefit of Korean Application No. 10-2018-0039234, filed on Apr. 4, 2018, the contents of which are hereby incorporated by reference herein in its entirety.

BACKGROUND OF THE INVENTION

Field of the Invention

The present invention relates to mobile communication.

Discussion of the Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

A new radio access technology (New RAT or NR) has been studied for the fifth generation (so-called 5G) mobile communication.

The NR-based cell may be operated in a standalone (SA), or may be operated in a non-standalone (NSA). According to the NSA, a UE can access a cell based on an E-UTRAN (i.e., LTE/LTE-A) and a cell based on a dual connectivity (DC). This dual connectivity is called EN-DC.

Meanwhile, mobility of a terminal in a mobile communication system is essential. For mobility, the UE continuously measures the quality of the serving cell and the quality of the neighboring cells. The UE transmits to the network the results of this measurement, the network provides the best mobility to the UE based on the measurement results.

For stable measurement, the UE needs to receive the SSB correctly. However, since the UE does not transmit UL signals or receive DL signals when Bandwidth Part (BWP) switching is performed, it is necessary to determine how to perform the BWP switching when BWP switching and SSB overlap.

SUMMARY OF THE INVENTION

Accordingly, a disclosure of the present specification has been made in an effort to solve the aforementioned problem.

Therefore, one disclosure of the present specification is aimed at suggesting a solution to the aforementioned problem.

To achieve the aforementioned purposes of the present invention, one disclosure of the present specification provides a method of performing Bandwidth Part (BWP) switching by a user equipment (UE). The method comprises scheduling to receive a Synchronization Signal Block (SSB) during a first period; determining whether to perform the BWP switching based on the first period and a second period representing time duration for performing the BWP switching; and when the first period and the second period do not overlap, performing the BWP switching.

Starting point of the BWP switching is earlier than starting point of receiving the SSB by at least the second period.

The method further comprises receiving, from a base station, a request for the BWP switching, wherein the UE determines whether to perform the BWP switching based on the request.

The method further comprises driving a timer for the BWP switching, wherein the UE determines whether to perform the BWP switching based on the timer.

When the first period and the second period overlap, the BWP switching is not performed.

To achieve the aforementioned purposes of the present invention, one disclosure of the present specification provides a user equipment (UE) for performing Bandwidth Part (BWP) switching. The UE comprises a transceiver configured to transmit or receive the signals; and a processor configured to control the transceiver, wherein the processor further configured to: schedule to receive a Synchronization Signal Block (SSB) during a first period; determine whether to perform the BWP switching based on the first period and a second period representing time duration for performing the BWP switching; and perform the BWP switching when the first period and the second period do not overlap.

According to a disclosure of the present invention, the above problem of the related art is solved.

BRIEF DESCRIPTION OF THE DRAWINGS

FIG. 3 illustrates cell detection and cell measurement procedures.

DETAILED DESCRIPTION OF THE EMBODIMENTS

Figure 1:
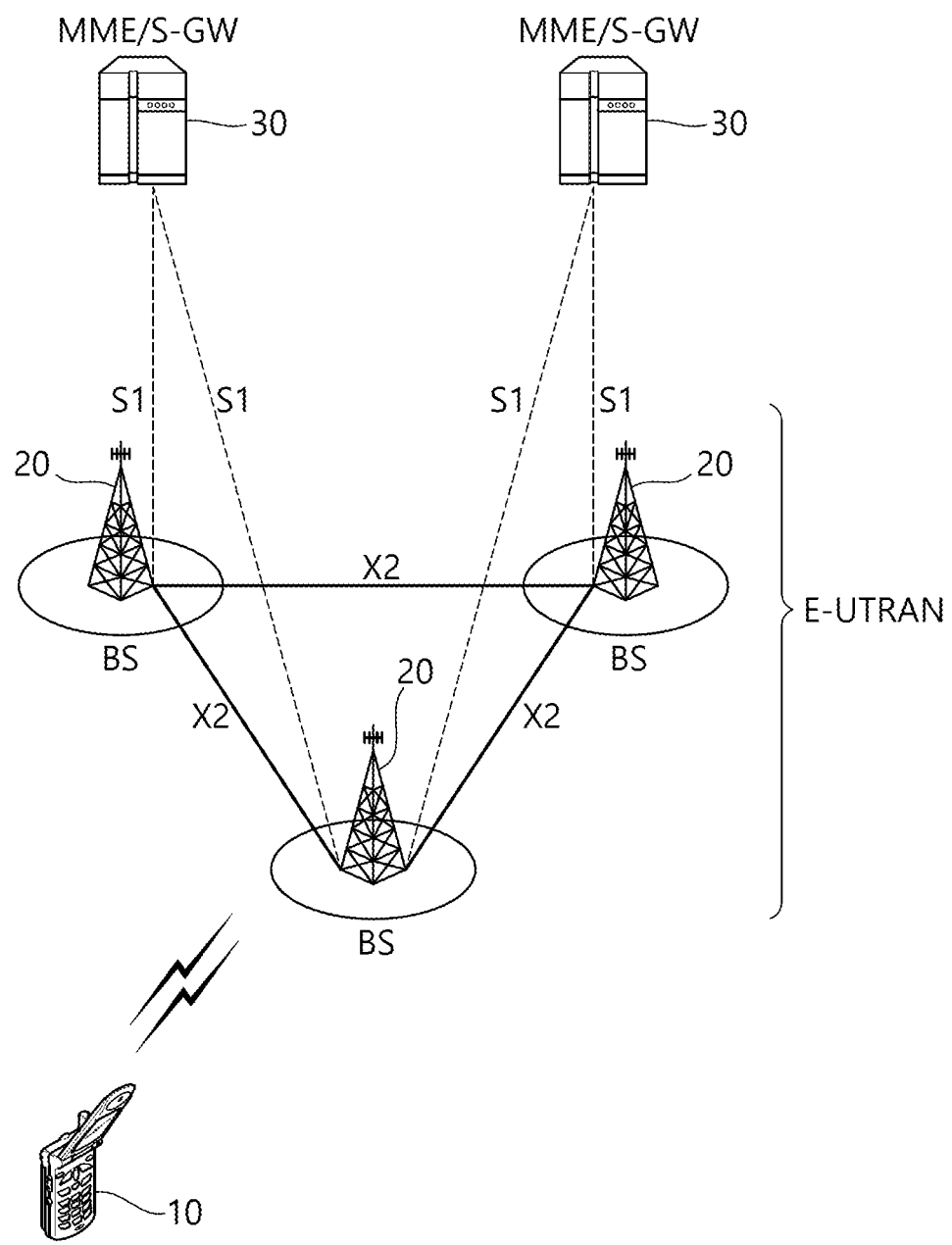
FIG. 1 illustrates an example of a wireless communication system to which the technical features of the present specification can be applied.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

The technical features described below can be used in a communication standard by the 3rd Generation Partnership Project (3GPP) standardization organization or a communication standard by the Institute of Electrical and Electronics Engineers (IEEE) standardization. For example, the communication specification by the 3GPP standardization organization includes the evolution of Long-Term Evolution (LTE) and/or LTE systems. The evolution of LTE systems includes LTE-A (Advanced), LTE-A Pro, and/or 5G NR (New Radio). The communication standard by the IEEE standardization organization includes a wireless local area network system such as IEEE 802.11a/b/g/b/ac/ax. The above-mentioned system uses various multiple access technologies such as Orthogonal Frequency Division Multiple Access (OFDMA) and/or Single Carrier-Frequency Division Multiple Access (SC-FDMA) for an uplink and/or downlink. For example, only the OFDMA may be used for the downlink, only the SC-FDMA may be used for uplink, and the OFDMA and the SC-FDMA may be used for the uplink and/or downlink, in a mixed manner.

FIG. 1 Illustrates an Example of a Wireless Communication System to which the Technical Features of the Present Specification can be Applied.

Specifically, FIG. 1 is an example based on an Evolved-Universal Terrestrial Radio Access Network (E-UTRAN). The above-mentioned LTE is part of E-UMTS (Evolved-UMTS) using Evolved-Universal Terrestrial Radio Access Network (E-UTRAN).

The E-UTRAN includes a base station (BS) 20 that provides a control plane and a user plane to a user equipment (UE) 10. The UE 10 may be fixed or mobile and may be called as another term such as a mobile station, a user terminal (UT), a subscriber station (SS), a mobile terminal (MT), a wireless device, a station (STA) or the like. The base station 20 is a fixed station that communicates with the UE 10 and may be referred to as another term such as an evolved NodeB (eNB), a base transceiver system (BTS), an access point, or the like.

The base stations 20 may be connected to each other through an X2 interface. The base station 20 is connected to an EPC (Evolved Packet Core) 30 through an S1 interface, more particularly, is connected to an MME (Mobility Management Entity) through an S1-MME and an S-GW (Serving Gateway) through an S1-U.

The EPC 30 is composed of an MME, an S-GW, and a P-GW (Packet Data Network-Gateway). The MME has information on the access information of the UE or the capability of the UE and this information is mainly used for managing the mobility of the UE. The S-GW is a gateway having an E-UTRAN as an end point, and the P-GW is a gateway having a PDN as an end point.

Figure 2:
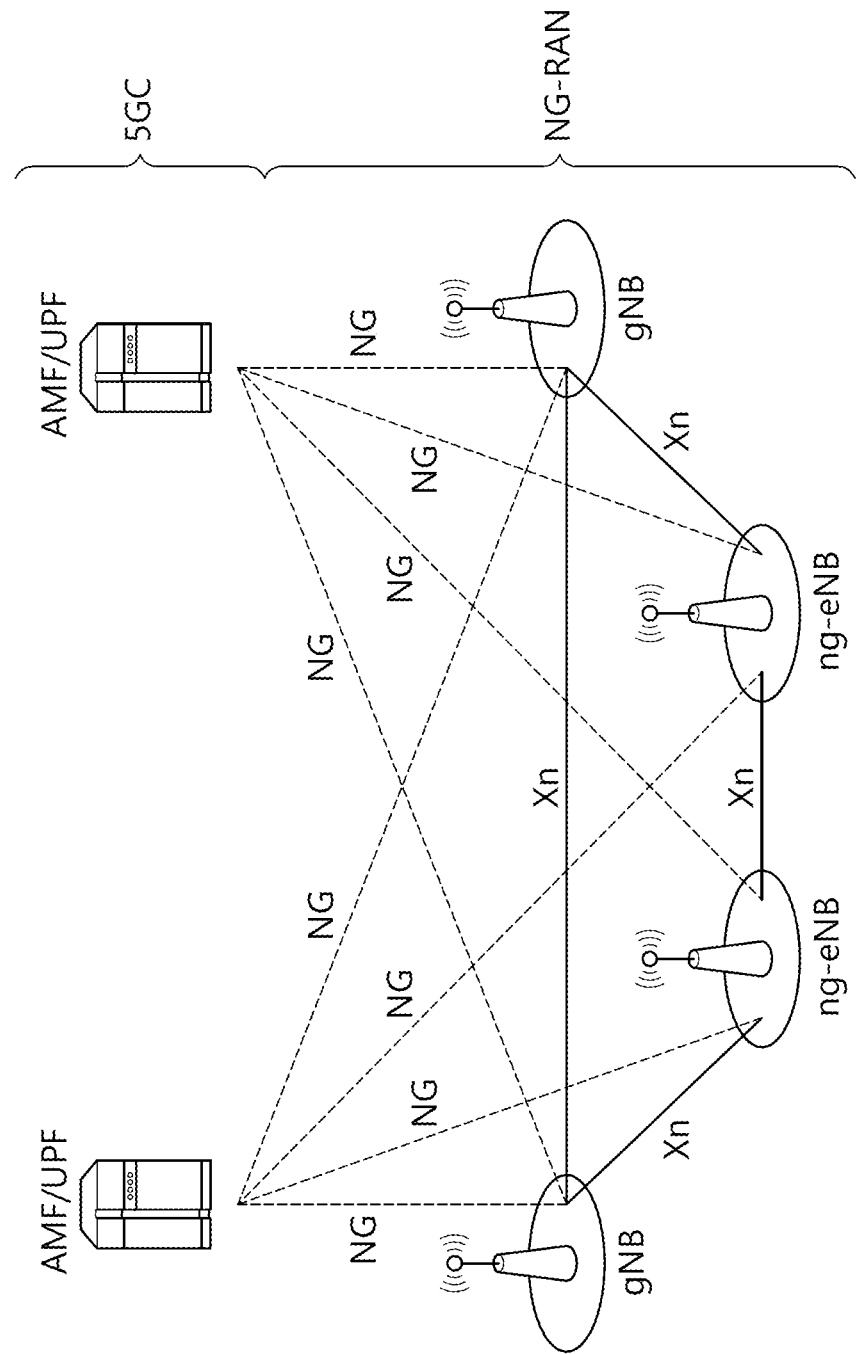
FIG. 2 illustrates another example of a wireless communication system to which the technical features of the present specification can be applied.

FIG. 2 Illustrates Another Example of a Wireless Communication System to which the Technical Features of the Present Specification can be Applied.

Specifically, FIG. 2 is an example in which a 5G NR (New Radio) standard is utilized. The communication entity used in the 5G NR standard (hereinafter referred to as "NR" standard) absorbs some or all of the functions of the entities (eNB, MME, S-GW) introduced in FIG. 1, and may be identified by the name of "NG" for distinction from the previous specification.

The system of FIG. 2 includes an NG-RAN (Radio Access Network) for communicating with a UE, and the NG-RANs 21, 22 are entities corresponding to a base station, and includes an gNB 21 or an ng-eNB 22. A network interface called an Xn interface is defined between the NG-RAN 21, 22 entities. The gNB 21 provides an NR user plane and control plane for the UE and accesses the 5GC (5G Core network) through the NG interface shown in FIG. 2. The Ng-eNB 22 is an entity providing a user plane and a control plane based on Evolved-Universal Terrestrial Radio Access (UTRA) for the UE, and the Ng-eNB 22 accesses the 5GC through the NG interface.

The Access and Mobility Management Function (AMF) is an entity including the functions of the conventional MME and communicates with the NG-RANs 21 and 22 through the NG-C interface. The NG-C interface is the control plane interface between the NG-RAN and the AMF.

The UPF (User Plane Function) is an entity including the functions of the conventional S-GW and communicates with the NG-RANs 21 and 22 through the NG-U interface. The NG-U interface is the user plane interface between the NG-RAN and the AMF.

On the system of FIG. 1 and/or FIG. 2, the layers of the Radio Interface Protocol between a network (e.g., NG-RAN and/or E-UTRAN) and the UE is classified as the lower three layers L1 (first layer), L2 (second layer) and L3 (third layer) based on the lower three layers of the Open System Interconnection (OSI) reference model, widely known in a communication system, and the physical layer belonging to the first layer provides an information transfer service using a physical channel and the RRC (Radio Resource Control) layer located at the third layer provides radio resources control between the UE and the network. To this end, the RRC layer exchanges RRC messages between the UE and the base station.

Hereinafter, the structure of a radio frame transmitted/received through a physical channel will be described.

In the LTE standard (and evolution of the LTE standard), one radio frame is composed of subframes, and one subframe is composed of two slots. The length of one subframe may be 1 ms and the length of one slot may be 0.5 ms. The time to be required for one subframe to be transmitted is called a transmission time interval (TTI). The TTI may be a minimum unit of scheduling.

Unlike the LTE standard, the NR standard supports various numerologies, and accordingly, the structure of the radio frame is set to be various. The NR standard supports a number of subcarrier spacings on the frequency domain, where the numerology of NR is determined by the numerology used. Table 1 below lists a number of numerologies supported in NR. Each of the numerologies is identified by an index "$\mu$".

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, the subcarrier spacing can be set to any one of 15, 30, 60, 120, and 240 kHz, but since specific values can be changed, each of the spacings (e.g., $\mu=0, 1, \ldots, 4$) may be indicated as a first, second to N-th subcarrier spacings.

As shown in Table 1, it may not be used to transmit user data (e.g., Physical Uplink Shared CHannel (PUSCH), Physical Downlink Shared CHannel (PDSCH), etc.) according to subcarrier spacing. That is, user data transmission may not be supported only at a specific at least one subcarrier spacing (e.g., 240 kHz).

Also, as shown in Table 1, when a synchronization channel (e.g., a primary synchronization signal (PSS), a secondary synchronization signal (SSS), a physical broadcast channel (PBCH), etc.) is not supported according to subcarrier spacing. That is, the synchronization channel may not be supported only in a specific at least one subcarrier spacing (e.g., 60 kHz).

The number of slots and the number of symbols included in the NR standard may be set differently according to various numerologies, i.e., various subcarrier spacings. A concrete example may be as shown in Table 2 below.

TABLE 2

| $\mu$ | Number of symbols in a slot | Number of slots in a radio frame | Number of slots in a subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

According to Table 2, when a first newsagent of "$\mu=0$" is applied, one radio frame includes 10 subframes, one subframe corresponds to one slot, and one slot includes 14 symbols. In this specification, 'symbol' refers to a signal transmitted during a specific time interval, and for example, it may refer to a signal generated by OFDM (Orthogonal Frequency Division Multiplexing) processing. That is, the symbols may be OFDM/OFDMA symbols, SC-FDMA symbols, or the like. A cyclic prefix (CP) may be located between each symbol.

FIG. 3 Illustrates a Cell Detection and Measurement Procedure.

Referring to FIG. 3, a UE detects a neighbor cell on the basis of a synchronization signal (SS) transmitted from the neighbor cell. The SS may include a primary synchronization signal (PSS) and a secondary synchronization signal (SSS).

When a serving cell 200a and a neighbor cell 200b each transmit a cell-specific reference signal (CRS) to the UE 100, the UE 100 performs measurement using the CRSs and transmits the measurement result to the serving cell 200a. Here, the UE 100 compares the power levels of the received CRSs on the basis of information about received reference signal power.

Here, the UE 100 may use the following three methods to perform the measurement.

1) Reference signal received power (RSRP): RSRP indicates the average received power of all REs carrying CRSs transmitted over the entire band. Here, the UE may measure the average received power of all REs carrying channel state information (CSI)-RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a CQI and may be determined as RSRP/RSSI depending on a measurement bandwidth or sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ=RSSI/RSSP may be used.

As illustrated, for the measurement, the UE 100 receives a radio resource configuration information element (IE) from the serving cell 100a. The radio resource configuration Dedicated) IE is used to configure/modify/release a radio bearer or to modify an MAC configuration. The radio resource configuration IE includes subframe pattern information. The subframe pattern information is information about a measurement resource restriction pattern on the time domain for measuring RSRP and RSRQ for a serving cell (e.g., primary cell).

For the measurement, the UE 100 receives a measurement configuration (hereinafter, also referred to as 'measconfig') IE from the serving cell 100a. A message including a measurement configuration IE is referred to as a measurement configuration message. Here, the measurement configuration IE may also be received through an RRC connection reconfiguration message. When the measurement result satisfies a report condition in measurement configuration information, the UE reports the measurement result to a base station. A message including a measurement result is referred to as a measurement report message.

The measurement configuration IE may include measurement object information. The measurement object information is information about an object that the UE measures. A measurement object includes at least one of an intra-frequency measurement object as an object of intra-cell measurement, an inter-frequency measurement object as an object of inter-cell measurement, and an inter-RAT measurement object as an object of inter-RAT measurement. For example, the intra-frequency measurement object may indicate a neighbor cell having the same frequency band as that of the serving cell, the inter-frequency measurement object may indicate a neighbor cell having a different frequency band from that of the serving cell, and the inter-RAT measurement object may indicate a neighbor cell having a different RAT from that of the serving cell.

TABLE 3

Description of measurement object field carrierFreq carrierFreq indicates an E-UTRA carrier frequency to which this configuration is applied.

measCycleSCell measCycleSCell indicates a cycle for measurement of a deactivated SCell. This value may be set to 160, 256, or the like. A value of 160 indicates that measurement is performed every 160 subframes.

The measurement configuration IE includes IEs illustrated in the following table.

TABLE 4

Description of MeasConfig field
allowInterruptions
A value of True indicates that interruptions to transmission and reception with a serving cell are allowed when a UE performs measurement using MeasCycleScell for carriers for a deactivated SCell.
measGapConfig
measGapConfig indicates the configuration or release of a measurement gap.

measGapConfig is used to configure or release a measurement gap (MG).

The measurement gap (MG) is a period for identification and RSRP measurement of a cell on a different frequency (inter-frequency) from that for the serving cell.

TABLE 5

Description of MeasGapConfig field
gapOffset
The value of gapOffset may be set to one of gp0, gp1, gp2, and gp3.
gp0 corresponds to a gap offset for a pattern ID "0" having MGRP = 40 ms. Gp1 corresponds to a gap offset for a pattern ID "1" having MGRP = 80 ms. gp2 corresponds to a gap offset for a pattern ID "2" having MGRP = 40 ms and MGL = 3 ms. gp3 corresponds to a gap offset for a pattern ID "3" having MGRP = 80 ms and MGL = 3 ms.

TABLE 6

| Gap pattern ID | Measurement gap length (MGL) | Measurement gap repetition period (MGRP) | Minimum time for performing measurement on inter-frequency and inter-RAT for period of 480 ms |
|---|---|---|---|
| 0 | 6 ms | 40 ms | 60 ms |
| 1 | 6 ms | 80 ms | 30 ms |
| 2 | 3 ms | 40 ms | 24 ms |
| 3 | 3 ms | 80 ms | 12 ms |

If the UE requires a measurement gap for identifying and measuring inter-frequency and inter-RAT cells, the E-UTRAN (i.e., the base station) provides one measurement gap (MG) pattern having a certain gap period.

The UE does not perform any data transmission and reception with the serving cell during the measurement gap period, retunes an RF chain thereof according to an inter-frequency, and performs measurement on the inter-frequency.

<Introduction of Dual Connectivity (DC)>

Recently, studies have been conducted on a method enabling a UE to simultaneously connect to different base stations, for example, a base station of a macrocell and a base station of a small cells. This method is referred to as dual connectivity (DC).

In DC, an eNodeB for a primary cell (PCell) may be referred to as a master eNodeB (hereinafter, referred to as MeNB). An eNodeB only for a secondary cell (SCell) may be referred to as a secondary eNodeB (hereinafter, referred to as SeNB).

A cell group including the primary cell (PCell) by the MeNB may be referred to as a master cell group (MCG) or PUCCH cell group 1, and a cell group including the secondary cell (SCell) by the SeNB may be referred to as a secondary cell group (SCG) or PUCCH cell group 2.

Among secondary cells in the secondary cell group (SCG), a secondary cell where a UE can transmit uplink control information (UCI) or a secondary cell where a UE can transmit a PUCCH may be referred to as a super secondary cell (super SCell) or a primary secondary cell (PSCell).

<Next-Generation Mobile Communication Network>

Due to the success of Long-Term Evolution (LTE)/LTE-Advanced (LTE-A) for fourth-generation mobile communication, there is a growing interest in next-generation mobile communication, that is, fifth-generation (5G) mobile communication, and studies thereon are continuously being conducted.

The International Telecommunication Union (ITU) defines 5G mobile communication as one providing a data transmission speed of up to 20 Gbps and a perceptible transmission speed of at least 100 Mbps or higher anyplace. 5G mobile communication is officially termed IMT-2020 and is expected to be commercialized worldwide toward 2020.

The ITU presents three usage scenarios, for example, enhanced mobile broadband (eMBB), massive machine-type communication (mMTC), and ultra-reliable and low-latency communication (URLLC).

URLLC relates to a usage scenario requiring high reliability and low latency. For example, autonomous driving, factory automation, and augmented reality services require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, the eMBB usage scenario relates to a usage scenario requiring a mobile ultra-wideband.

That is, a 5G generation mobile communication system is aimed at higher capacity than existing 4G LTE, can increase the density of mobile broadband users, and can support device-to-device (D2D), high-stability and machine-type communication (MTC). 5G research and development is also aimed at lower latency and lower battery consumption than a 4G mobile communication system in order to properly implement the Internet of Things. For 5G mobile communication, a new radio access technology (new RAT or NR) may be proposed.

Figure 4A:
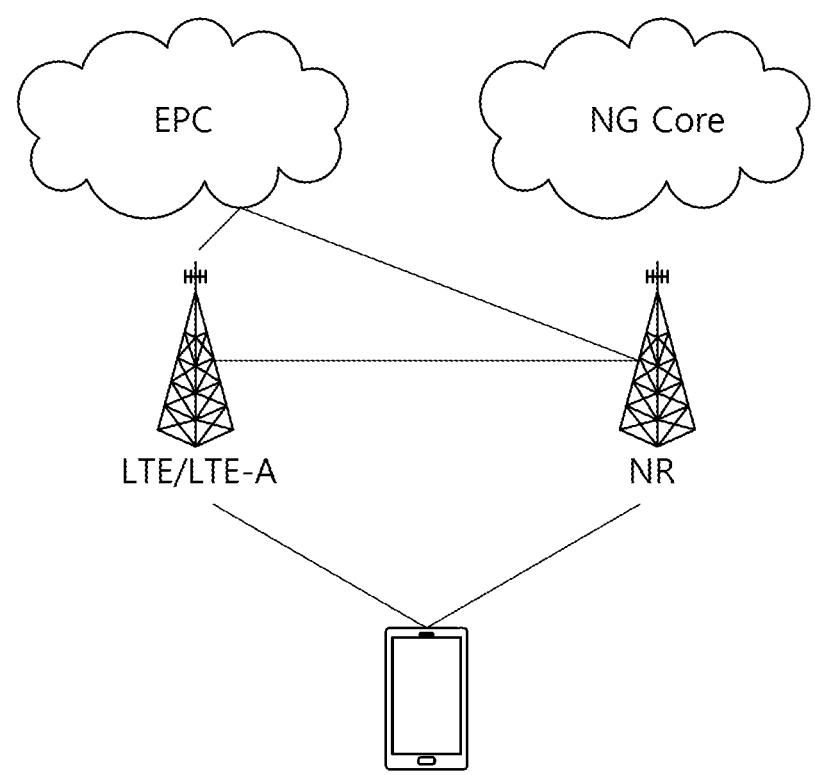
FIGS. 4A-4C illustrate exemplary architecture for the service of the next generation mobile communication.
Figure 4B:
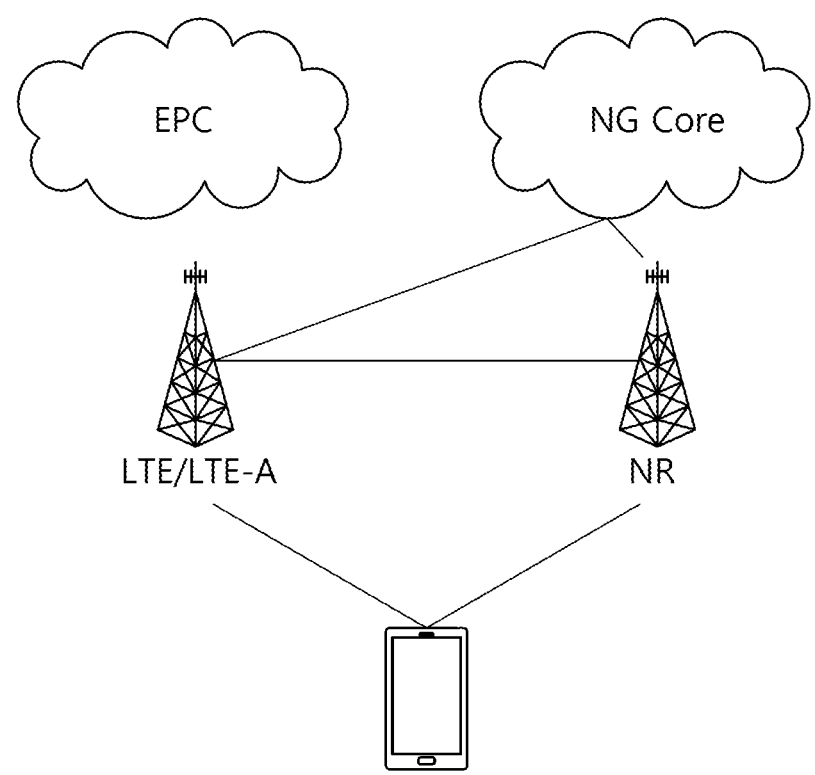
Figure 4C:
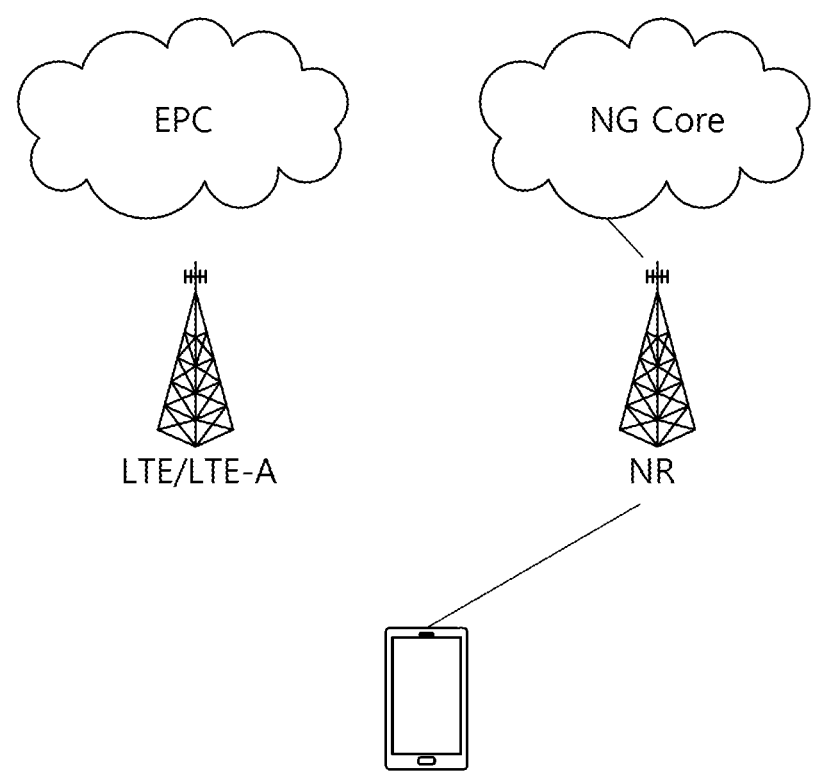

FIGS. 4A-4C Illustrate Exemplary Architecture for a Next-Generation Mobile Communication.

Referring to FIG. 4A, a UE is connected to an LTE/LTE-A-based cell and an NR-based cell in a dual connectivity (DC) manner.

The NR-based cell is connected to a core network for existing 4G mobile communication, that is, an evolved packet core (EPC).

Referring to FIG. 4B, unlike in FIG. 4A, an LTE/LTE-A-based cell is connected to a core network for 5G mobile communication, that is, a next-generation (NG) core network.

A service method based on the architectures illustrated in FIGS. 4A and 4B is referred to as a non-standalone (NSA) scheme.

Referring to FIG. 4C, a UE is connected only to an NR-based cell. A service method based on this architecture is referred to as a standalone (SA) scheme.

In NR, it may be considered to use a downlink subframe for reception from a base station and to use an uplink subframe for transmission to the base station. This method may be applied to paired spectra and unpaired spectra. A pair of spectra means that two carrier spectra are included for downlink and uplink operations. For example, in a pair of spectra, one carrier may include a downlink band and an uplink band that are paired.

Figure 5:
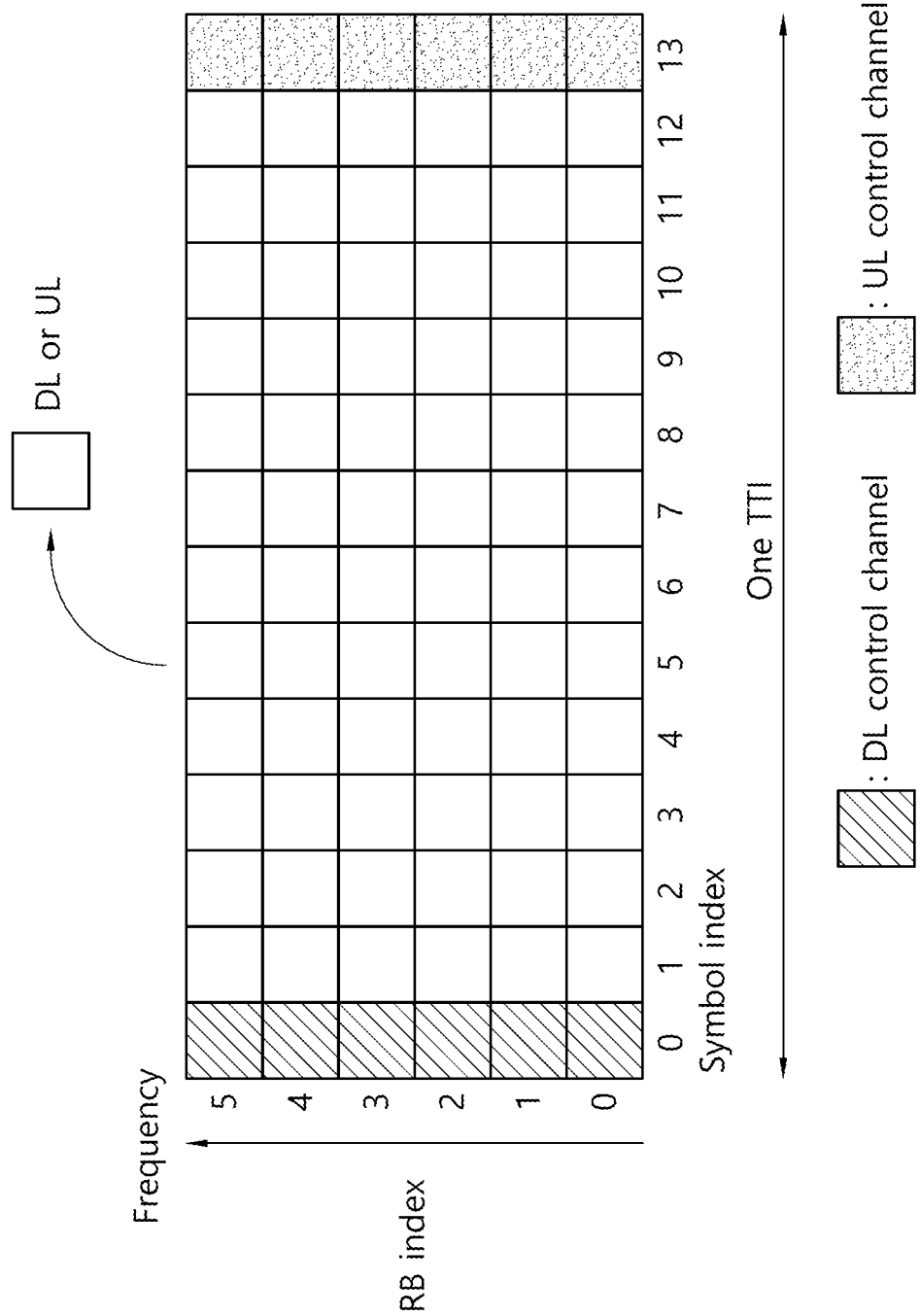
FIG. 5 illustrates an example of a subframe type in NR.

FIG. 5 Illustrates an Example of a Subframe Type in NR.

A transmission time interval (TTI) of FIG. 5 may be referred to as a subframe or slot for NR (or new RAT). A subframe (or slot) of FIG. 5 may be used in a TDD system of NR (or new RAT) to minimize data transmission latency. As shown in FIG. 5, the subframe (or slot) includes 14 symbols, similarly to the current subframe. A front portion symbol of the subframe (or slot) may be used for a DL control channel, and an end portion symbol of the subframe (or slot) may be used for a UL control channel. The remaining symbols may be used for DL data transmission or UL data transmission. According to such a subframe (or slot) structure, DL transmission and UL transmission may be sequentially performed in one subframe (or slot). Accordingly, DL data may be received within the subframe (or slot), and a UL acknowledgement (ACK/NACK) may be transmitted within the subframe (or slot). The subframe (or slot) structure may be referred to as a self-contained subframe (or slot). The use of the subframe (or slot) structure has an advantage in that a time required to transmit data which has been erroneously received is reduced, thereby minimizing a final data transmission latency. In the self-contained subframe (or slot) structure, a time gap may be required in a process of transitioning from a transmission mode to a reception mode or from the reception mode to the transmission mode. For this, some OFDM symbols may be set to a guard period (GP) when switching from DL to UL in the subframe structure.

Figure 6:
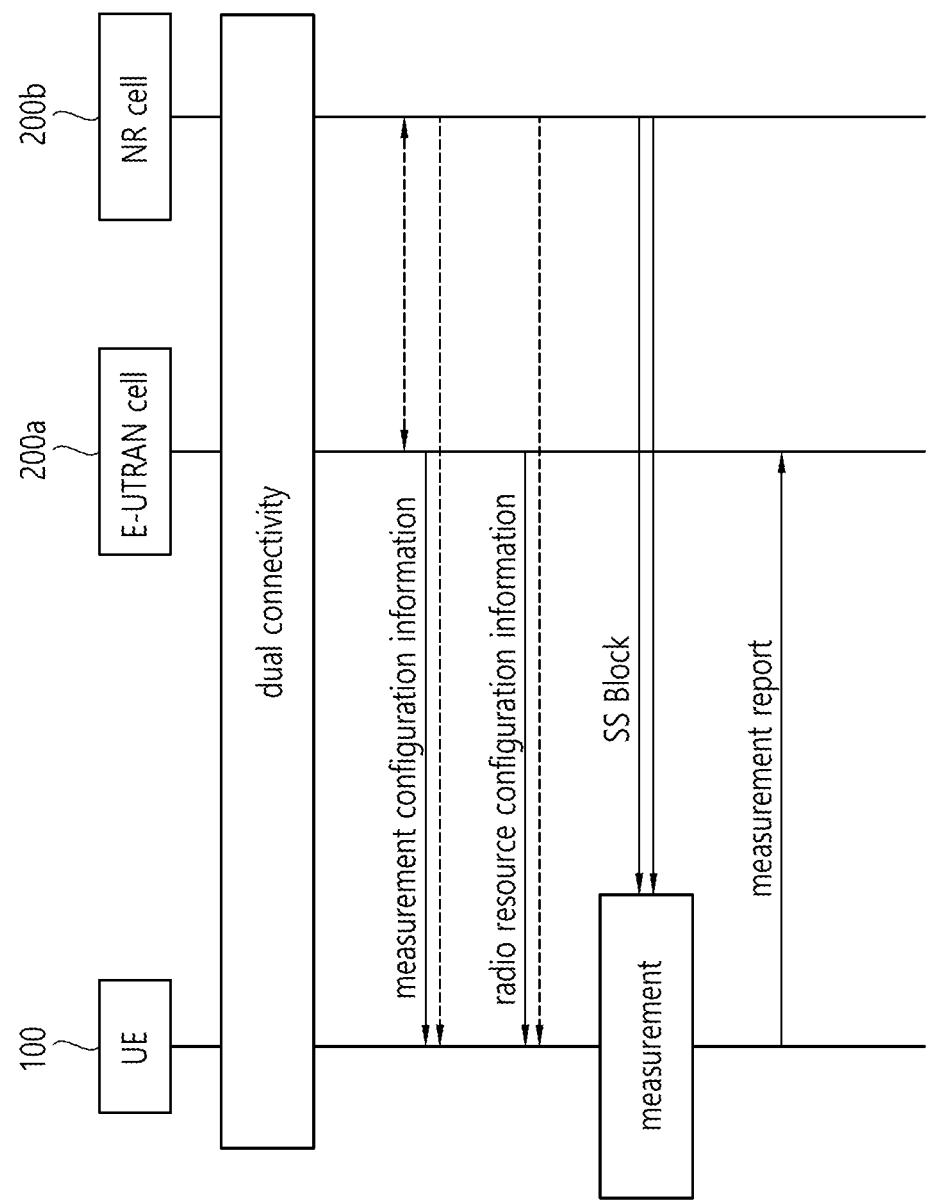
FIG. 6 illustrates example of performing measurements in the EN-DC.

FIG. 6 Illustrates an Example of Performing Measurements in E-UTRAN and NR (EN) DC.

Referring to FIG. 6, a UE 100 is connected to an E-UTRAN (i.e., LTE/LTE-A) cell and an NR cell in an EN-DC manner. Here, a PCell in the DC is the E-UTRAN (i.e., LTE/LTE-A) cell, and a PSCell in the DC may be the NR cell.

The UE 100 may receive a measurement configuration (also referred to as 'measconfig') IE of the E-UTRAN (i.e., LTE/LTE-A) cell that is the PCell. The measurement configuration ('measconfig') IE received from the E-UTRAN (i.e., LTE/LTE-A) cell may further include fields illustrated in the following table in addition to those illustrated in Table 4.

TABLE 7

Description of MeasConfig field
fr1-Gap
This field is included when a UE is configured in EN-DC. This field indicates whether a gap is applied for measurement on an FR1 band (illustrated in Table 9).
mgta
This field indicates whether to apply a timing advance (TA) of 0.5 ms to a measurement gap configuration provided by an E-UTRAN.

The measurement configuration ('measconfig') IE may further include a measGapConfig field for configuring a measurement gap (MG), as illustrated in Table 4.

A gapoffset field in the measGapConfig field may further include gp4, gp5, . . . , and gp11 for EN-DC in addition to those illustrated in Table 5.

The UE 100 may receive a measurement configuration ('measconfig') IE of the NR cell as the PSCell directly from the NR cell or via the E-UTRAN cell as the PCell.

The measurement configuration ('measconfig') IE of the NR cell may include fields illustrated in the following table.

TABLE 8

Description of MeasConfig field
measGapConfig
This field indicates the configuration or release of a measurement gap
s-MeasureConfig
This field indicates a threshold value for NR SpCell RSRP measurement when a UE needs to perform measurement in a non-serving cell.

measGapConfig may include fields illustrated in the following table.

TABLE 9

Description of MeasGapConfig field
gapFR2
This field indicates a measurement gap configuration applicable to in a frequency range of FR2.
gapOffset
This field indicates a gap offset of a gap pattern along with an MGRP.
mgl
This field indicates a measurement gap length in ms, which may be, for example, 3 ms, 4 ms, 6 ms, or the like.
mgrp
This field indicates a measurement gap repetition period in ms.
mgta
This field indicates whether to apply a timing advance (TA) of 0.5 ms to a measurement gap configuration.

As illustrated, the UE 100 receives a radio resource configuration IE of the E-UTRAN (i.e., LTE/LTE-A) cell as the PCell. Further, the UE 100 may receive a radio resource configuration IE of the NR cell as the PSCell from the NR cell or via the E-UTRAN as the PCell. As described with reference to FIG. 3, the radio resource configuration IE includes subframe pattern information.

The UE 100 performs measurement and reports the measurement result. Specifically, the UE 100 interrupts data transmission and reception with the E-UTRAN (i.e., LTE/LTE-A) cell as the PCell during the measurement gap period, retunes an RF chain thereof, and performs measurement on the basis of an SS block (SSB) received from the NR cell.

Meanwhile, for stable measurement, the UE needs to receive the SSB correctly. However, since the UE does not transmit UL signals or receive DL signals when Bandwidth Part (BWP) switching is performed, it is necessary to determine how to perform the BWP switching when BWP switching and SSB overlap.

Figure 7:
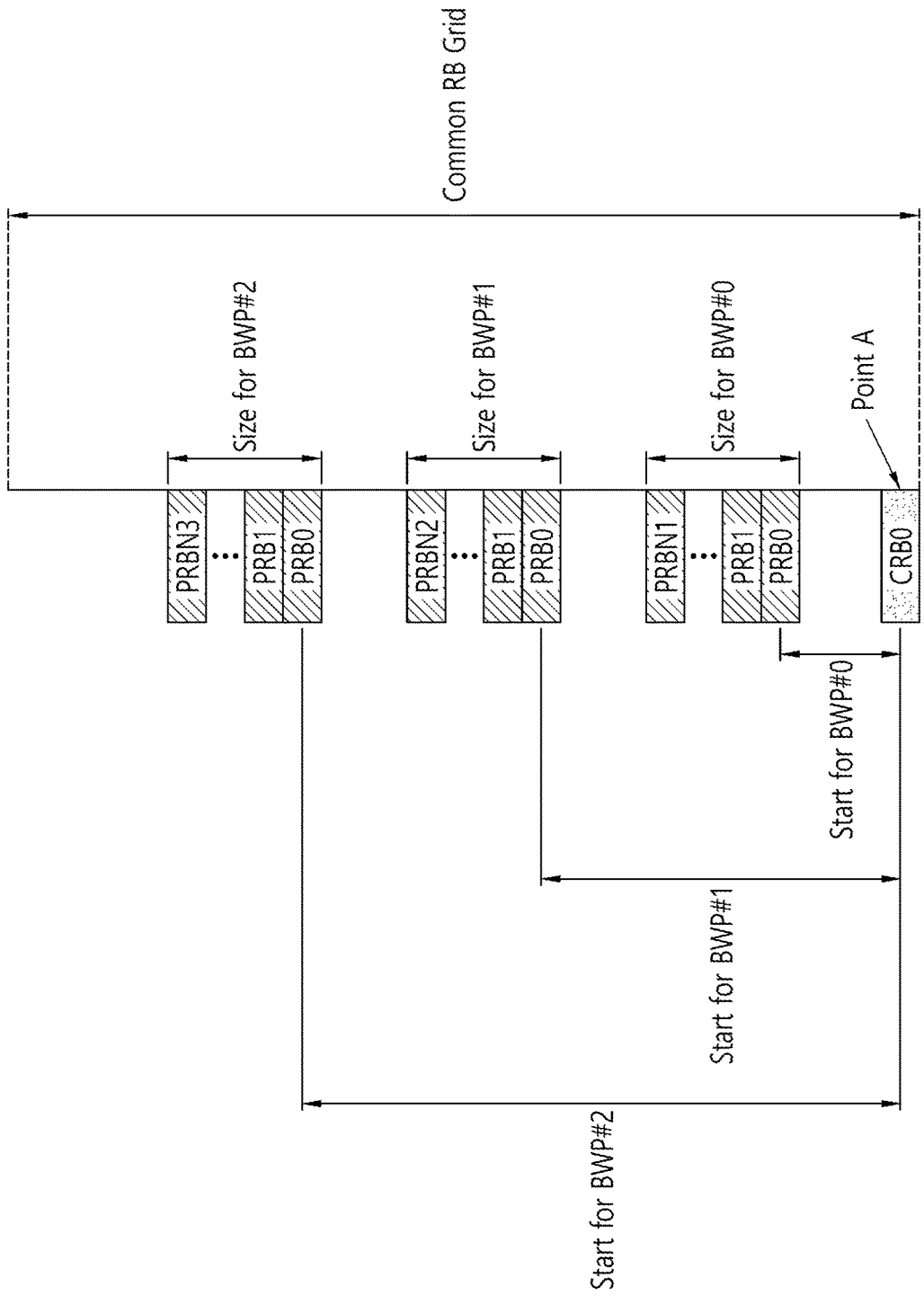
FIG. 7 illustrates an example of the frequency allocation technique in this specification.

FIG. 7 Illustrates an Example of the Frequency Allocation Technique in this Specification.

As shown, a number of BWPs can be defined within the CRB grid. The reference point of the CRB grid (which may be referred to as a common reference point, starting point, etc.) is referred to in the NR specification as so-called "point A" and is indicated by the RMSI (i.e., SIB1) described above. Specifically, the frequency offset between the frequency band in which the SSB is transmitted and the "point A" can be indicated via the RMSI, The "point A" corresponds to the center frequency of the CRB0 as shown. The "point A" may be a point at which the variable "k" indicating the frequency band of the resource element RE on the NR specification is set to zero. A plurality of BWPs shown in FIG. 7 is an example set for one cell (e.g., Primary Cell). The plurality of BWPs may be set individually or commonly as shown for each cell.

As shown, each BWP can be defined through a starting point and size from CRB0. For example, the first BWP, BWP #0, defines the starting point through an offset from CRB0, and the size of the BWP can be determined through the size for the BWP #0.

A specific number (e.g., up to four) of BWPs may be set for the UE. At a specific point in time, only a specific number (e.g., one) of BWPs per cell may be active. The number of configurable BWPs or the number of activated BWPs may be set in common for the uplink and the downlink, or may be set individually. The UE may perform PDSCH, PDCCH, and/or CSI (Channel State Information)-RS monitoring/reception only for the activated downlink BWP. Also, the UE may perform PUSCH (Physical Uplink Shared CHannel) and PUCCH (Physical Uplink Control CHannel) transmission only for the activated uplink BWP.

Figure 8:
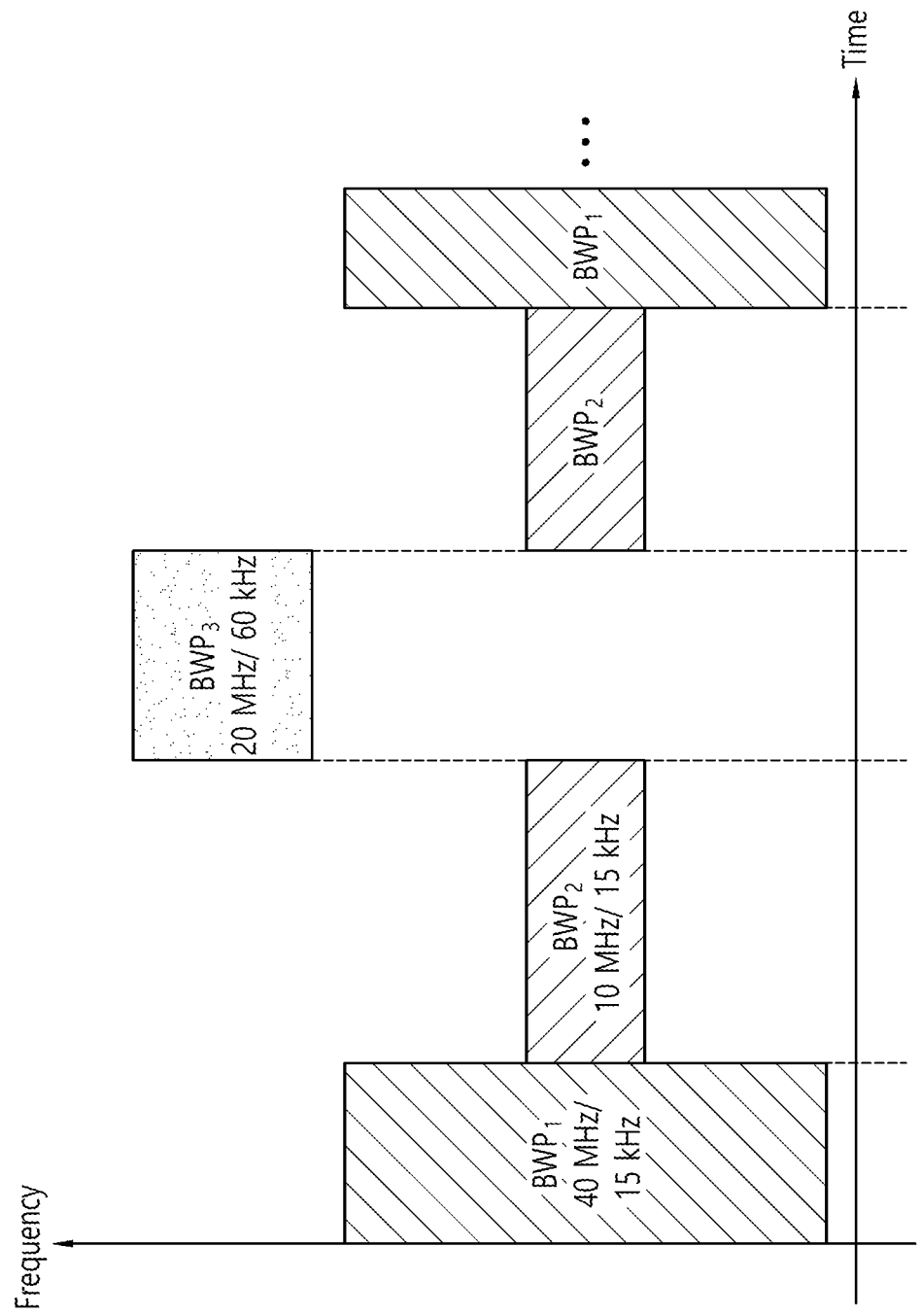
FIG. 8 illustrates an example in which a plurality of BWPs is allocated.

FIG. 8 Illustrates an Example in which a Plurality of BWPs is Allocated.

As shown, three BWPs can be set, a first BWP spans a 40 MHz band, and subcarrier spacing of 15 kHz may be applied. Also, a second BWP spans the 10 MHz band and subcarrier spacing of 15 kHz may be applied. Also, the third BWP spans the 20 MHz band and subcarrier spacing of 60 kHz may be applied. The UE may set up at least one of the illustrated BWPs as active BWPs and perform uplink and/or downlink data communication via the corresponding BWPs.

A method of allocating time resources of resource allocation techniques is as follows. The time resource may be indicated in a manner that indicates a time difference/offset based on the transmission time point of the PDCCH allocating the downlink or uplink resources. For example, it can indicate the start point of the PDSCH/PUSCH corresponding to the PDCCH and the number of symbols occupied by the PDSCH/PUSCH.

Figure 9:
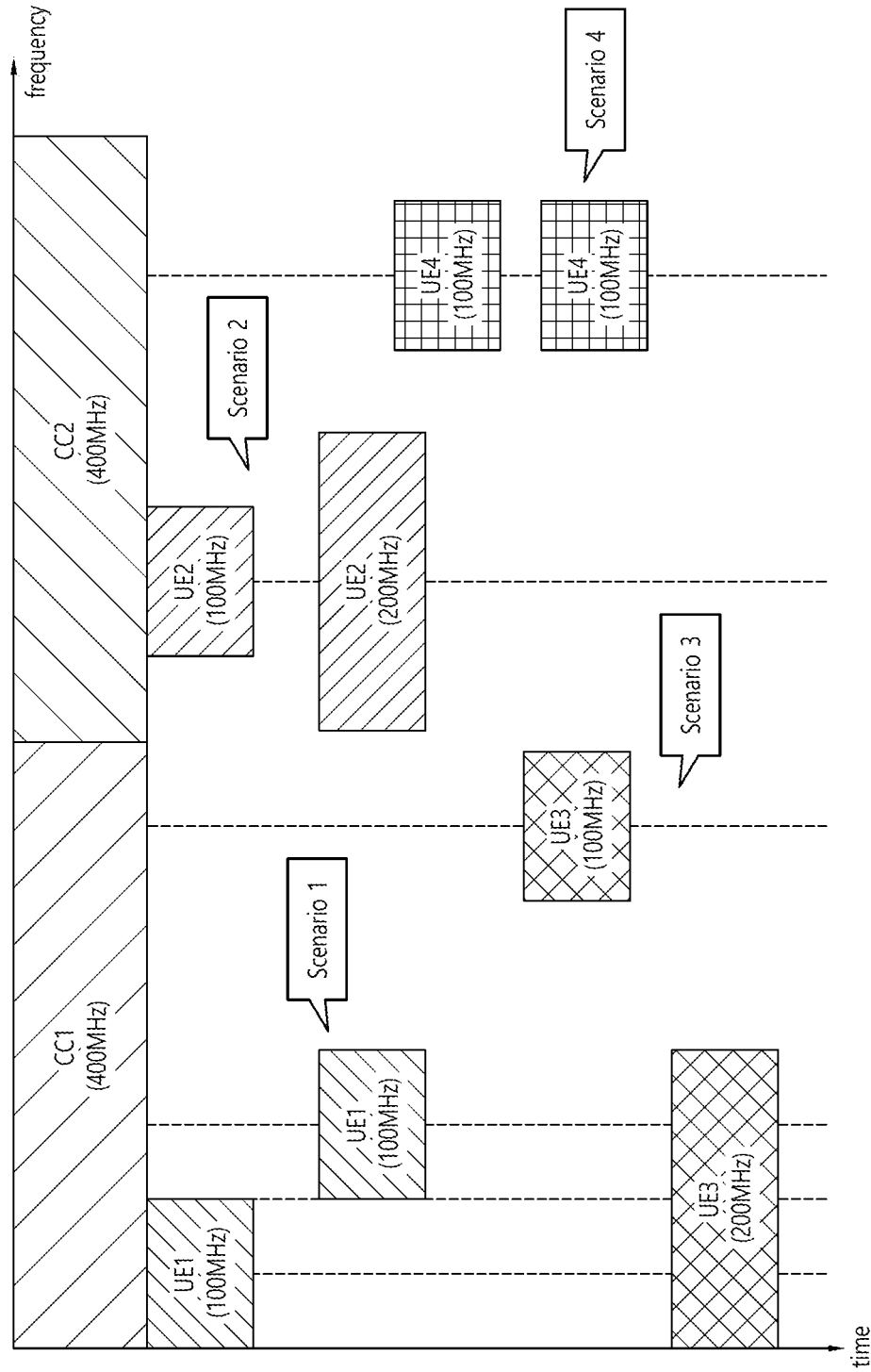
FIG. 9 illustrates an example of the configuration of BWP.

FIG. 9 Illustrates an Example of the Configuration of BWP.

Referring to FIG. 7, there are four scenarios for BWP configuration.

The first scenario involves changing the center frequency of the BWP without changing its BW. The reconfiguration may or may not involve changing the SCS.

The second scenario involves changing the BW of the BWP without changing its center frequency. The reconfiguration may or may not involve changing the SCS.

The third scenario involves changing both the BW and the center frequency of the BWP. The reconfiguration may or may not involve changing the SCS.

The fourth scenario involves changing only the SCS, where the center frequency and BW of the BWP remain unchanged.

In order to perform these scenarios, the UE may need switching delays for retuning the local oscillator, for reconfiguring the RF chain for more or less bandwidth, for reconfiguring the RF chain for a given SCS, or for a combination of these operations.

<BWP Switching Delay>

For DCI-based active BWP switch, the transition time of active DL or UL BWP switch is the time duration $T_{BWPswitchDelay}$ from the end of last OFDM symbol of the PDCCH carrying the active BWP switch DCI till the beginning of a slot indicated by K0 in the active DL BWP switch DCI or K2 in the active UL BWP switch DCI.

For timer-based active BWP switch, the transition time of active DL or UL BWP switch is the time duration $T_{BWPswitchDelay}$ from the beginning of the subframe (FR1) or from the beginning of the half-subframe (FR2) immediately after a BWP timer expires till the beginning of a slot UE is able to receive DL signals or transmit UL signals in the default DL BWP for paired spectrum or the default DL or UL BWP for unpaired spectrum.

For DCI-based BWP switch, after the UE receives BWP switching request at slot n on a serving cell, UE shall be able to receive PDSCH (for DL active BWP switch) or transmit PUSCH (for UL active BWP switch) on the new BWP on the serving cell on which BWP switch occurs no later than at slot $n+T_{BWPswitchDelay}$.

For timer-based BWP switch, the UE shall start BWP switch at slot n, where n is the beginning of a subframe (FR1) or half-subframe (FR2) immediately after a BWP-inactivity timer bwp-InactivityTimer [2] expires on a serving cell, and the UE shall be able to receive PDSCH (for DL active BWP switch) or transmit PUSCH (for UL active BWP switch) on the new BWP on the serving cell on which BWP switch occurs no later than at slot $n+T_{BWPswitchDelay}$.

The UE is not required to transmit UL signals or receive DL signals during time duration $T_{BWPswitchDelay}$ on the cell where DCI-based BWP switch or timer-based BWP switch occurs. And, the UE is not expected to receive a DCI indicating active DL (UL) BWP change in OFDM symbols other than the first 3 OFDM symbols of a slot.

Depending on UE capability bwp-SwitchingDelay [2], UE shall finish BWP switch within the time duration $T_{BWPswitchDelay}$ defined in Table 10.

TABLE 10

| $\mu$ | NR Slot length (ms) | BWP switch delay $T_{BWPswitchDelay}$ (slots) Type 1[Note 1] | Type 2[Note 1] |
|---|---|---|---|
| 0 | 1 | [1] | [3] |
| 1 | 0.5 | [2] | [5] |
| 2 | 0.25 | [3] | [9] |
| 3 | 0.125 | [6] | [17] |

[Note 1]Depends on UE capability.
[Note 2]If the BWP switch involves changing of SCS, the BWP switch delay is determined by the larger one between the SCS before BWP switch and the SCS after BWP switch.

<Disclosure of the Present Invention>

The present invention proposes the method of performing a Bandwidth Part (BWP) switching to ensure stable NR measurement.

For the BWP configurations, the BWP switching delay may be needed for retuning the local oscillator, for reconfiguring the RF chain for more or less bandwidth, for reconfiguring the RF chain for a given SCS, or for a combination of these operations.

The switching delay is described by the following:

1) Composed of BB processing delay and RF transition time.

2) The type 4 (per UE) capability signalling to differentiate the Type 1 and Type 2 BWP switching delays for each scenario is agreed to be introduced.

Parameters for the BWP switching delay are given in following Table. The values are applied to both DCI-based and timer-based BWP switching.

TABLE 11

| Frequency Range | Scenario | Type 1 Delay (us) | Type 2 Delay (us) | Comment |
|---|---|---|---|---|
| 1 | 1 | 600 | 2000 | |
| | 2 | 600 | 2000 | |
| | 3 | 600 | 2000 | |
| | 4 | 400 | 950 | No delay required from the RF perspective |
| 2 | 1 | 600 | 2000 | |
| | 2 | 600 | 2000 | |
| | 3 | 600 | 2000 | |
| | 4 | 400 | 950 | No delay required from the RF perspective |

The numbers in the Table 11 are calculated from the end of the last symbol including the DCI indicating the BWP switch and until BB processing delay and RF transition time has been completed.

The Synchronization Signal Block (SSB) is expected not to be transmitted from serving cell during the BWP switching delay. The SS/PBCH Block Measurement Time Configuration (SMTC) duration is configured with one value among {1 ms, 2 ms, 3 ms, 4 ms, 5 ms} which is closely related to length of configured SSB. The SSB length is summarized in Table 11 for FR1 and FR2.

TABLE 12

| | | Length of SSB (SS block) # of SS block (L) | | |
|---|---|---|---|---|
| Freq. Range | SS SCS (kHz) | 4 | 8 | 64 |
| FR1 | 15 | 2 ms | 4 ms | N.A. |
| | 30 | 1 ms | 2 ms | N.A. |

TABLE 12-continued

| | | Length of SSB (SS block) # of SS block (L) | | |
|---|---|---|---|---|
| Freq. Range | SS SCS (kHz) | 4 | 8 | 64 |
| FR2 | 120 | N.A. | N.A. | 4 ms |
| | 240 | N.A. | N.A. | 2 ms |

Figure 10A:
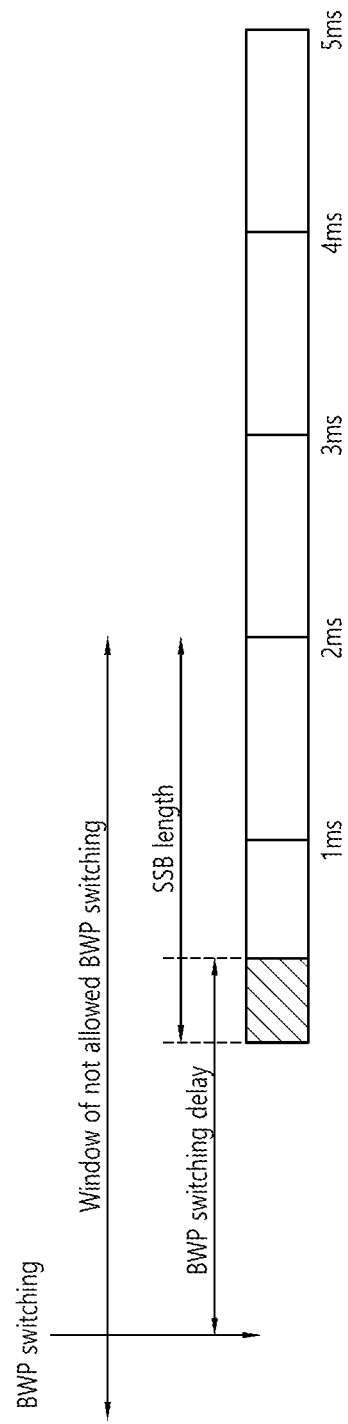
FIG. 10A illustrates one example in which BWP switching and SSB overlap and FIG. 10B illustrates one example in which BWP switching and SSB do not overlap.

FIG. 10A Illustrates One Example in which BWP Switching and SSB Overlap.

Examples illustrated in FIG. 10A is for SCS=15 kHz & L=4 in Table 12.

Referring to FIG. 10A, the BWP switching delay (i.e. transition time of BWP switching) may be overlapped with SSB length (of neighboring cell) in aspects of measurement. In other words, the starting point of BWP switching is not earlier than the starting point of receiving the SSB by the BWP switching delay. In other words, BWP switching procedure is not finished until the start of receiving the SSB.

It can give impact the measurement requirement such as PSS/SSS detection, time index detection and measurement period for serving cell. In other words, in overlapping case, the measurement requirement can be complicated and is not always ensured to be met due to changing BWP switching dynamically.

If considering overlap between BWP switching delay and SSB length, time duration for BWP switching may be overlapped fully or partially with the SSB. If the receiving of the SSB is overlapped with BWP switching delay, the overlapped SSB cannot be used for measurement. Therefore, for the measurement, the BWP switching should not overlap with the SSB.

If BWP switching delay and SSB length overlap, the BWP switching may not be performed. For DCI-based BWP switch, if the UE receives DCI indicating performing of the BWP switching in the window of not allowed BWP switching in formula 1 as below, the UE may not perform the BWP switching. Or, for timer-based BWP switch, if the timer for the BWP switching expires in the window of not allowed BWP switching in formula 1 as below, the UE may not perform the BWP switching.

Figure 10B:
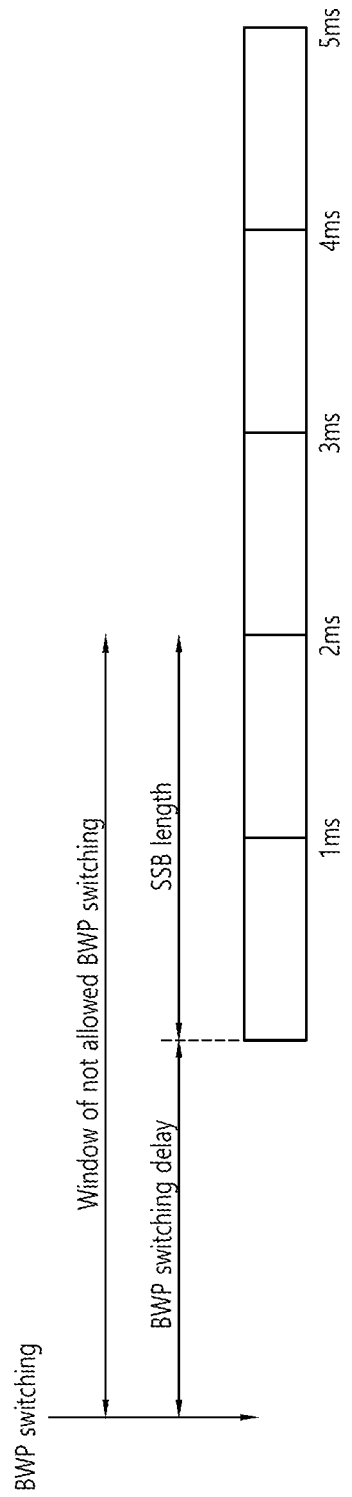

FIG. 10B Illustrates One Example in which BWP Switching and SSB do not Overlap.

Examples illustrated in FIG. 10B is for SCS=15 kHz & L=4 in Table 12.

Referring to FIG. 10B, for the stable NR measurement, the BWP switching may be configured at least before BWP switching delay from starting point of SSB or starting point of SMTC duration. In other words, the starting point of BWP switching is earlier than the starting point of receiving SSB by at least the BWP switching delay. In other words, BWP switching procedure is finished before the start of receiving SSB. The BWP switching delay may mean the time duration to perform BWP switching. Therefore, if the BWP switching is configured before BWP switching delay from starting point of SSB, the BWP switching may be completed before the starting point of SSB.

As above, the window of not allowed BWP switching can be defined as following formula.

window of not allowed BWP switching=SSB length+BWP switching delay before starting slot of SSB  [Formula 1]

That is, the window of not allowed BWP switching is SSB length plus BWP switching delay before starting slot of SSB. In other words, The BWP switching shall be started before the sum of the SSB length and the BWP switching delay from the end of reception of the SSB. In other words, BWP switching shall be started at least before the BWP switching delay from the start of reception of the SSB.

From the FIGS. 10A and 10B, the present invention proposes as follows.

Proposal 1: BWP switching should be configured with not overlapping BWP switching delay and configured SSB.

Proposal 2: For measurement requirement, add the condition of BWP switching—UE is not expected that BWP switching occurs within SSB length and within slot(s) corresponding BWP switching delay before starting slot of SSB.

Proposals can ultimately stabilize the measurement and can help stabilize the operation of the NR system. And proposals can be the same effect in measurement of the neighbor cell. The reason is that each cell (serving cell, neighbor cell) applies BWP switching for each corresponding terminal.

For DCI-based BWP switch, if the UE receives DCI indicating performing of the BWP switching before the window of not allowed BWP switching in formula 1, the UE may perform the BWP switching. For timer-based BWP switch, if the timer for the BWP switching expires before the window of not allowed BWP switching in formula 1, the UE may perform the BWP switching.

The number of slot corresponding to BWP switching delay, Y, is summarized in following Table. Here, N.A is 'not applicable'.

TABLE 13

| Frequency Range | BWP switching delay (us) | Number of slot corresponding to BWP switching delay (us) = Y (slot) DATA SCS (kHz) | | | |
|---|---|---|---|---|---|
| | | 15 | 30 | 60 | 120 |
| FR1 | 400 | 1 | 1 | 2 | N.A. |
| | 600 | 1 | 2 | 3 | N.A. |
| | 950 | 1 | 2 | 4 | N.A. |
| | 2000 | 2 | 4 | 8 | N.A. |
| FR2 | 400 | N.A. | N.A. | 2 | 4 |
| | 600 | N.A. | N.A. | 3 | 5 |
| | 950 | N.A. | N.A. | 4 | 8 |
| | 2000 | N.A. | N.A. | 8 | 16 |

In Table 13, when Frequency Range is FR1 and Data subcarrier spacing (SCS)=60 kHz, the BWP switching delay 600 us corresponds to 3 slots (3×250 us, Data SCS 60 kHz). It means that the BWP switching command must be executed before 3 slots. The values specified in the table above are interpreted and applied in the same way.

In Table 13, FR1 means frequency range 1 (below 6 GHz) and FR2 means frequency range2 (24 GHz or more mmWave band).

On the other hand, SCS of DATA and synchronization signal (SS) can be summarized in following Table.

TABLE 14

| SCS | DATA | | SCS | |
|---|---|---|---|---|
| | FR1 | FR2 | FR1 | FR2 |
| 15 kHz | ✓ | | ✓ | |
| 30 kHz | ✓ | | ✓ | |
| 60 kHz | ✓ | ✓ | | |

TABLE 14-continued

| SCS | DATA | | SCS | |
|---|---|---|---|---|
| | FR1 | FR2 | FR1 | FR2 |
| 120 kHz | | ✓ | | ✓ |
| 240 kHz | | | | ✓ |

And, the slot length corresponding to each SCS is summarized in following Table.

TABLE 15

| SCS | $N_{symb/slot}$ | Slot [ms] |
|---|---|---|
| 15 kHz | 14 | 1 |
| 30 kHz | 14 | 0.5 |
| 60 kHz | 14 | 0.25 |
| 120 kHz | 14 | 0.125 |
| 240 kHz | 14 | 0.0625 |

Figure 11:
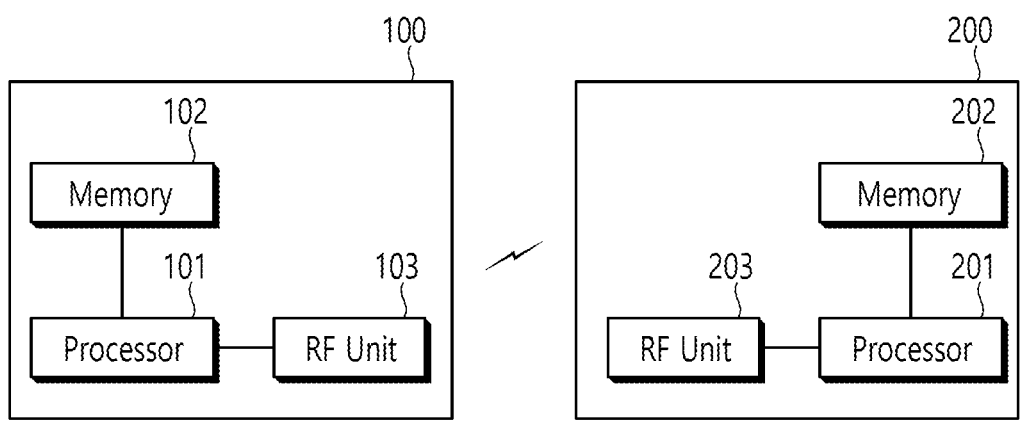
FIG. 11 is a block diagram illustrating a wireless communication system in which a disclosure of the present specification is implemented.

FIG. 11 is a Block Diagram Illustrating a Wireless Communication System in which a Disclosure of the Present Specification is Implemented.

The base station 200 includes a processor 210, a memory 220, and a radio frequency (RF) unit 230. The memory 220 is connected with the processor 210 to store various pieces of information for driving the processor 210. The RF unit 230 is connected with the processor 210 to transmit and/or receive a radio signal. The processor 210 implements a function, a process, and/or a method which are proposed. In the aforementioned embodiment, the operation of the base station may be implemented by the processor 210.

UE 100 includes a processor 110, a memory 120, and an RF unit 130. The memory 120 is connected with the processor 110 to store various pieces of information for driving the processor 110. The RF unit 130 is connected with the processor 110 to transmit and/or receive the radio signal. The processor 110 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

Figure 12:
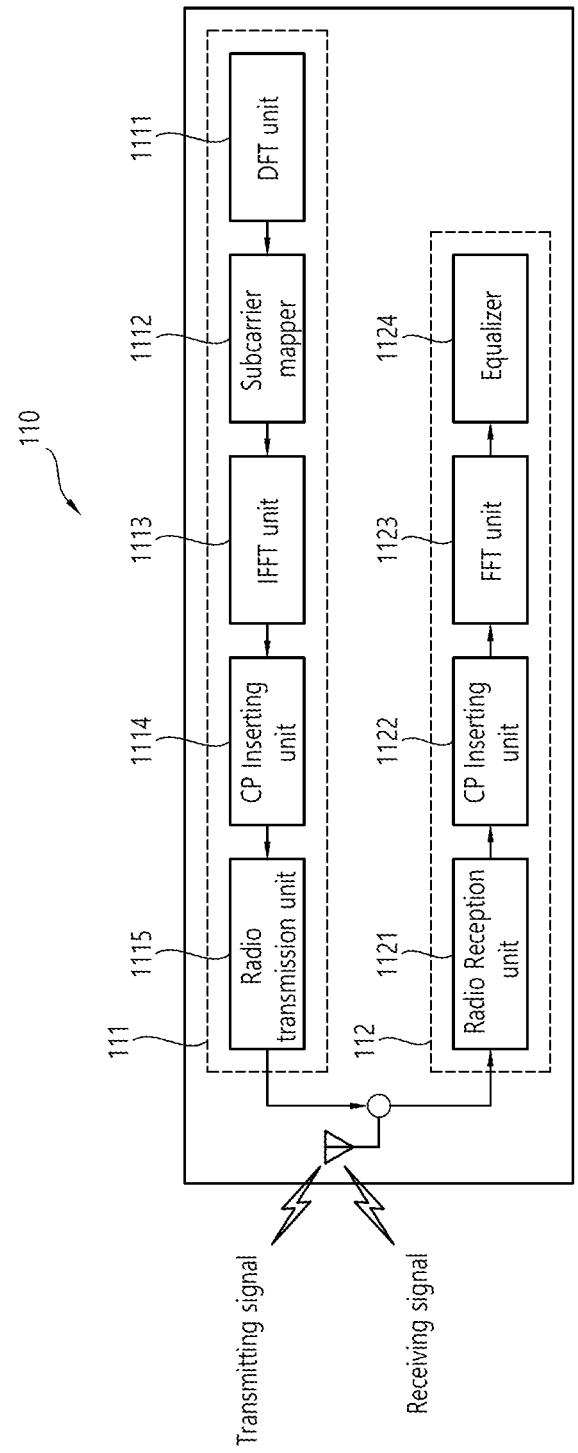
FIG. 12 is a detailed block diagram of a transceiver included in the wireless device shown in FIG. 11.

FIG. 12 is a Detailed Block Diagram of a Transceiver Included in the Wireless Device Shown in FIG. 11.

Referring to FIG. 12, the transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

What is claimed is:

1. A method of performing Bandwidth Part (BWP) switching by a user equipment (UE), the method comprising:
   scheduling to receive a Synchronization Signal Block (SSB) during a first period;
   determining whether to perform the BWP switching based on the first period and a second period representing a time duration for performing the BWP switching; and
   based on that the first period and the second period do not overlap, performing the BWP switching,
   wherein a starting point of the BWP switching is earlier than a starting point of receiving the SSB by at least the second period.

2. The method of claim 1, further comprising receiving, from a base station, a request for the BWP switching,
   wherein the UE determines whether to perform the BWP switching based on the request.

3. The method of claim 1, further comprising driving a timer for the BWP switching,
   wherein the UE determines whether to perform the BWP switching based on the timer.

4. The method of claim 1, wherein based on the first period and the second period overlapping, the BWP switching is not performed.

5. A user equipment (UE) configured to perform Bandwidth Part (BWP) switching, the UE comprising:
   a transceiver; and
   a processor configured to control the transceiver,
   wherein the processor is further configured to:
   schedule to receive a Synchronization Signal Block (SSB) during a first period;
   determine whether to perform the BWP switching based on the first period and a second period representing a time duration for performing the BWP switching; and
   perform the BWP switching based on that the first period and the second period do not overlap,
   wherein a timing to start the BWP switching is earlier than a timing to start receiving the SSB by at least the second period.

6. The UE of claim 5, wherein the processor is further configured to:
   receive, from a base station through the transceiver, a request for the BWP switching, and
   determine whether to perform the BWP switching based on the request.

7. The UE of claim 5, wherein the processor is further configured to:
   drive a timer for the BWP switching; and
   determine whether to perform the BWP switching based on the timer.

8. The UE of claim 5, wherein based on the first period and the second period overlapping, the BWP switching is not performed.

9. A processing apparatus configured to control a user equipment (UE) to perform Bandwidth Part (BWP) switching, the processing apparatus comprising:
   at least one processor, and
   at least one computer memory operably connected to the at least one processor and storing instructions that, based on being executed by the at least one processor, perform operations comprising:
   scheduling to receive a Synchronization Signal Block (SSB) during a first period;
   determining whether to perform the BWP switching based on the first period and a second period representing a time duration for performing the BWP switching; and
   performing the BWP switching based on that the first period and the second period do not overlap,
   wherein a timing to start the BWP switching is earlier than a timing to start receiving the SSB by at least the second period.

10. The processing apparatus of claim 9, wherein the operations further comprise:
    receiving, from a base station, a request for the BWP switching, and
    determining whether to perform the BWP switching based on the request.

11. The processing apparatus of claim 9, wherein the operations further comprise:
    driving a timer for the BWP switching; and
    determining whether to perform the BWP switching based on the timer.

12. The processing apparatus of claim 9, wherein based on the first period and the second period overlapping, the BWP switching is not performed.

* * * * *